May 7, 1963  F. HARTWIG  3,089,071
SHAVING APPARATUS
Filed Feb. 24, 1959  2 Sheets-Sheet 2
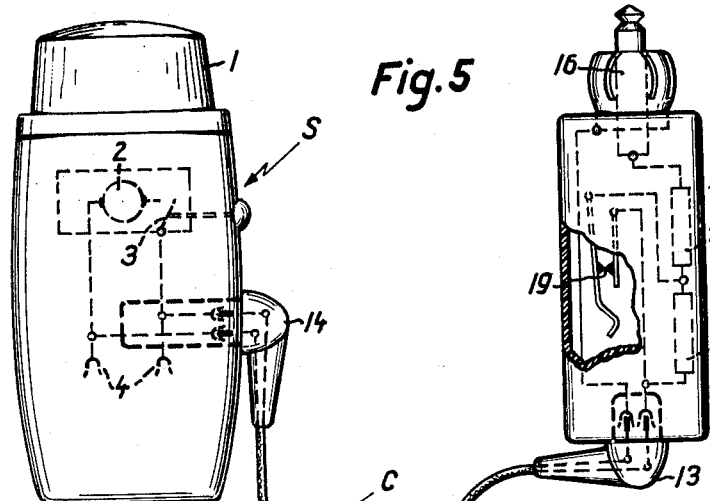
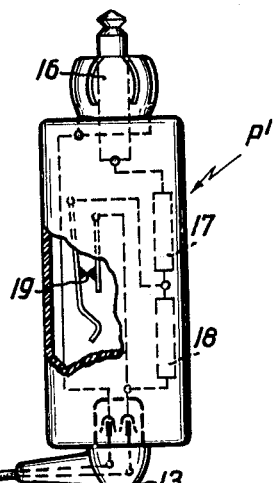
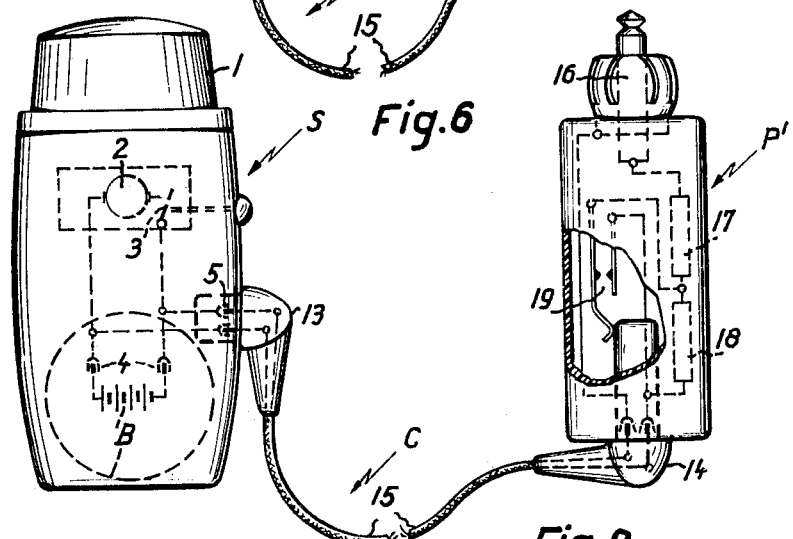
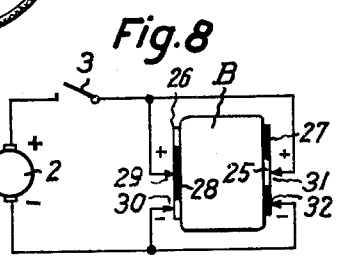
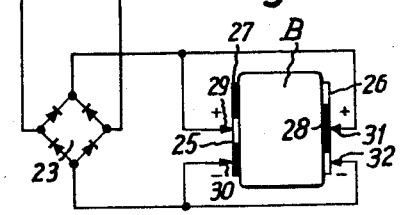
Inventor:
FRITZ HARTWIG
By Toulmin & Toulmin
Attorneys United States Patent Office 3,089,071
Patented May 7, 1963

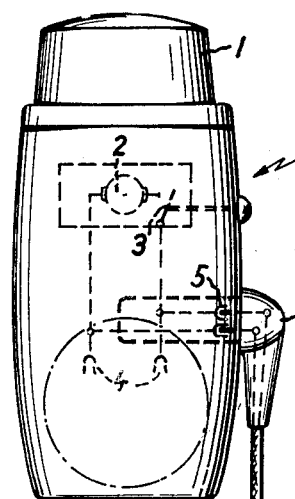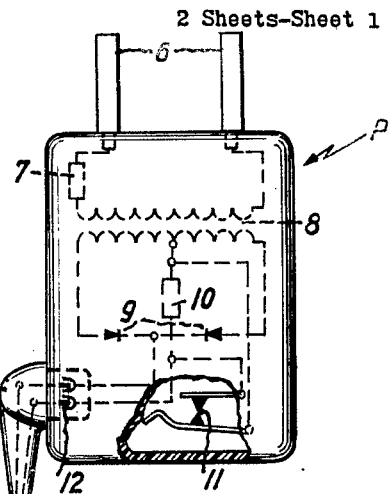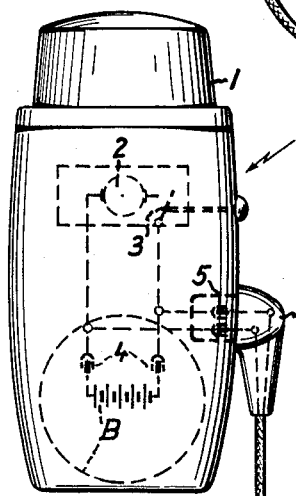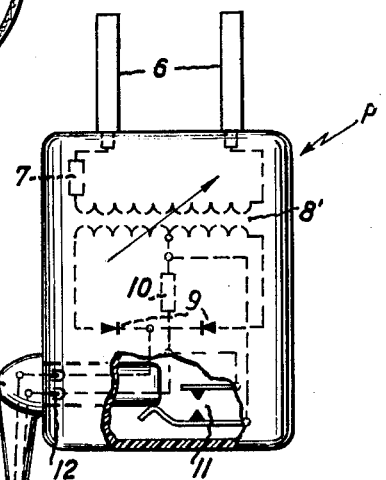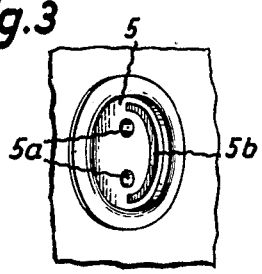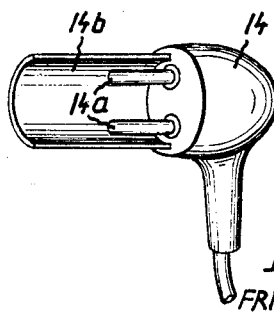

3,089,071
SHAVING APPARATUS
Fritz Hartwig, Oldenburg, Germany, assignor to Licentia Patent-Verwaltungs-G.m.b.H., Hamburg, Germany
Filed Feb. 24, 1959, Ser. No. 795,279
Claims priority, application Germany Feb. 24, 1958
12 Claims. (Cl. 320—2)

The present invention relates to shaving apparatus.

More particularly, the present invention relates to a dry shaving apparatus incorporating a shaving unit having a shaving head, a motor connected to the shaving head for driving the same, a removable rechargeable battery, and switch means for controlling the motor. The shaving unit has associated with it suitable means for recharging the battery as well as for enabling the shaving unit to be operated from any one of a number of different sources of electric energy.

There exist dry shavers which incorporate a universal motor or an oscillating armature type motor, which shavers are adapted to be energized from an alternating current source, suitable adapted plug means or switching means being provided for enabling the shaver to be connected to different voltages. In this way, the shaver can be run from any one of a number of different sources of electric energy.

There also exist dry shavers which do not require an outside source of energy, such as mechanically operated shavers driven by a spring-wound motor or an inertia-type motor, or shavers in which the shaving head is driven by a direct current motor which is energized from an exchangeable dry cell battery or from a small rechargeable gas-tight battery. Such a battery is removably arranged in the shaver, or both the battery and an appropriate charging circuit may be permanently built into the shaver.

There also exist shavers which can be operated either from a battery or from an outside source. Such a shaver may be obtained by equipping an apparatus carrying its own battery and charging circuit with additional circuitry which allows the motor to be driven directly from an outside source, i.e., with circuitry which will allow the battery to be by-passed. Alternatively, a shaver containing a battery may be sold and used in conjunction with two adapter units, one of which allows the battery to be recharged from line voltage and the other of which is used when the shaver is to be operated directly from the outside source of electric energy.

In order to provide for greater flexibility of use, additional adapters may be provided which allow the shaver to be energized from a different power source, such as a direct current net or an external battery, as, for example, an automobile battery.

The above-described arrangements cause the shaver to be relatively heavy and difficult to manage. Also, it is necessary either to provide the shaver with an electric cord in order to adapt it for use on external power sources, or to provide an ever increasing number of adapted units. Furthermore, care had to be taken to avoid polarity error in shavers having removable batteries, i.e., suitable means had to be provided to make certain that the small gas-tight batteries would be inserted properly into the shaver, despite the fact that these batteries are normally so constructed that their external characteristics do not give any immediate indication of their polarity It is, therefore, an object of the present invention to provide a shaving apparatus which overcomes the above disadvantages.

It is another object of the present invention to provide a shaver which is very light and easy to handle.

It is yet another object of the present invention to provide a shaver which can be energized in any one of a number of different ways but which at the same time incorporate few separate units, and in which shaver provision is made for preventing improper connection of the units to each other.

The objects of the present invention also include the provision of a shaver which may be mass-produced easily and economically and which will give long periods of trouble-free service.

With the above objects in view, the present invention mainly resides in a shaving apparatus comprising a shaving unit and a power unit separate from the shaving unit. The shaving unit has a shaving head, a motor connected to the shaving head for driving the same, a rechargeable battery, switch means connected in circuit with the motor, and electric connector means connected in circuit with the circuit formed by the motor, the battery and the switch means. The power unit is adapted to be connected to an external source of electric energy and has adapting means for adapting electric energy supplied by the external source to electric energy suitable for operating the motor and to electric energy suitable for recharging the battery, and electric connector means in circuit with the output of the adapting means. Additionally, connecting means are provided for electrically connecting with each other the two electric connector means of the two units, so that the shaving unit may be operated either from the battery or from the external source of electric energy, as desired, and the battery may, when necessary, be recharged from the external source of electric energy.

More particularly, the battery is removable from the shaving unit and the adapting means of the power unit comprise switching means movable between a first position wherein the electric energy supplied from the external source is, at the output of the adapting means, suitable for operating the motor and a second position wherein the electric energy supplied from the external source is, at the output of the adapting means, suitable for recharging the battery. The connecting means which electrically connect the two connector means of the two units with each other have two connector elements each of which is adapted to be connected to either of the two connector means. One of these connector elements is so shaped that when it is connected to the connector means of the power unit, the switching means are in the first position thereof and the other of the connector elements has finger means which, when this other connector element is connected to the connector means of the power unit, engages the switching means to move the same to its second position and which finger means, when this other connector element is connected to the connector means of the shaving unit, projects into the space normally occupied by the battery.

Suitable provision is made to prevent polarity error whenever the removable battery, which can be inserted into the shaving unit in either one of two positions, is placed into the shaving unit. To this end, the battery carries a positive and a negative contact and the shaving unit carries a pair of positive and a pair of negative contacts. The contacts are so arranged that when the battery is inserted into the shaving unit in one of the two positions, the positive contact of the battery is in electrical engagement with one of the pair of positive contacts of the shaving unit and the negative contact of the battery is in electrical engagement with one of the pair of negative contacts of the shaving unit, and that when the battery is inserted into the shaving unit in the other of the two positions, the positive contact of the battery is in electrical engagement with the other of the pair of positive contacts of the shaving unit and the negative contact of the battery is in electrical engagement with the other of the pair of negative contacts of the shaving unit. As a result, the battery will be connected to the shaving unit with the same polarity irrespective of the position in which the battery is inserted into the shaving unit.

Additional objects and advantages of the present invention will become apparent upon consideration of the following detailed description taken in conjunction with the accompanying drawing in which:

FIG. 1 is a pictorial and schematic representation of a shaving apparatus according to the present invention in which the shaving and power units are so connected to each other that the shaving unit can be operated from an external source of electric energy;

FIG. 2 is a pictorial and schematic representation of the same shaving unit in which the shaving and power units are so connected to each other that a battery carried by the shaving unit may be recharged from the external source;

FIG. 3 is a fragmentary illustration showing the electric connector means of one of the two units;

FIG. 4 is a perspective illustration of a connector element adapted to be plugged into the connector means shown in FIG. 3;

FIG. 5 is a pictorial and schematic representation of a shaving apparatus similar to that of FIG. 1 except that the power unit is one adapted to be plugged into a conventional automobile cigar lighter socket, the shaving and power units being so connected to each other that the shaving unit may be operated directly from the automobile battery;

FIG. 6 is a pictorial and schematic representation of the same shaving apparatus as depicted in FIG. 5 except that the two units are so connected to each other that the battery carried by the shaving unit may be recharged from the automobile battery;

FIG. 7 is a schematic representation showing the battery when connected for charging, the battery being shown in one position; and FIG. 8 is a schematic representation showing the battery when connected to the motor of the shaving head, the battery being shown in the other of its positions.

Referring now to the drawings, and to FIGS. 1 to 4 thereof in particular, there is shown a shaving apparatus comprising a shaving unit S and a power unit P. The shaving unit is equipped with a conventional shaving head 1, a direct current motor 2 connected to the shaving head 1 for driving the same, a switch 3 in circuit with the motor 2, a pair of internal electric connectors indicated schematically at 4 and a pair of external electric connectors 5, these pairs of connectors being arranged in parallel with each other.

The shaving unit is adapted to carry a removable rechargeable storage battery B which is shown both mechanically and schematically in FIG. 2.

The power unit P is provided with male plugs 6 adapted to be inserted into an ordinary household electrical outlet socket (not shown), which plugs are connected to the primary winding of a stepdown transformer 8 by way of a fuse 7. The secondary winding of the transformer is connected to a rectifier circuit made up of two individual rectifiers 9. The center tap of the secondary winding is connected to a current-limiting resistor 10, which is connected in parallel with a switch 11, the latter being normally spring-urged to the closed position shown in FIG. 1. The above-described elements of the power unit P constitute an adapter means, and the output of this adapter means is connected to an external electric connector 12.

Actually, the power units in FIG. 1 and FIG. 2 differ in that the power unit in FIG. 2 shows a variable transformer 8′ so as to adapt the power unit to different voltages of external supply sources. Otherwise, these two power units are identical.

When the switch 11 is closed, the resistor 10 is short-circuited so that the output of the adapter is suitable for operating the motor 2. However, when the switch 11 is open, the resistor 10 will limit the current so that the output of the adapter means is suitable for charging or recharging the battery B. The position of the switch 11 thus determines the position of the adapter means, i.e., the position of the switch determines whether the output of the adapter means is suitable for operating the motor 2 or for charging the battery B.

A connecting means C is provided for electrically connecting with each other the two electric connectors 5 and 12 of the shaving and power units. These connecting means comprise two connecting plug elements 13 and 14 arranged at the opposite ends of an electric cord or line 15, and each of these elements is adapted to be connected to either of the connectors 5 and 12. As is best shown in FIGS. 3 and 4, the connector means 5 of the shaving unit comprises two female sockets 5a which are partly encompassed by an arcuate cut-out 5b. The connector plug 14 is formed with two make plugs 14a adapted to be received by the female sockets 5a, and with a partly cylindrical or tubular portion 14b adapted to fit through the cut-out 15b.

The electric connector means 12 of the power unit is identical to that of the above-described connector means 5 of the shaving unit, and the connector element 13 of the connector means C is identical to connector plug 14, with but one exception in that its partly cylindrical or tubular portion is shorter. Thus, either of the connector plugs 14 and 13 may be plugged into the external connector of either of the two units without it being possible to interconnect the units with improper polarity.

The difference in the lengths of the projecting portions of the two connector plugs is of importance in that the longer portion 14b of the plug 14 acts as a finger that has two distinct functions, depending upon to which of the two units the plug 14 is connected. When the plug 14 is connected to the shaving unit, as shown in FIG. 1, the finger projects into the space normally occupied by the battery B, as illustrated by the dot-and-dash circle, and acts as a feeler to sense the presence of a battery. However, when the plug 14 is connected to the power unit, as shown in FIG. 2, the finger acts as a camming means for moving the switch 11 from closed to open position.

It will be seen from the above that three operations can be carried out:

(a) When the shaving unit S carries a battery B and is disconnected from the connecting means C, the shaving unit may be used as a battery-operated device.

(b) When the connector plug 13 is connected to the connector 12 of the power unit P and the connector plug 14 is connected to the connector 5 of the shaving unit S, the shaving unit may be as an externally energized device. It will be noted that this connection leaves the switch 11 in closed position so that the output of the power unit will be suiable for driving the motor 2. Furthermore, it will be seen that with the shorter connector plug 13 in the power unit P, the longer connector plug 14 must perforce be used in the shaving unit S, and this connection can be effected only when the battery B is removed.

(c) When the connector plug 14 is connected to the connector 12 of the power unit P and the plug 13 is connected to the connector 5 of the shaving unit S, the battery B can be recharged from the external source to which the power unit is connected. It will be noted that when the battery is carried by the shaving unit, it is not possible to plug the connector plug 14 into the shaving unit, but only the shorter connector plug 13. Consequently, the longer connector plug 14 must be used in the power unit, and when this is done, the switch 11 will be opened, thereby, in effect, re-introducing the current-limiting resistor 10 into the circuit of the adapter means. The charging current is thus limited to a safe value, which is but a fraction of that of the rated current of the motor 2. In this way, there is no danger that the battery B will be damaged due to an excessively high charging rate. This will be so even if the switch 3 is inadvertently left closed during the charging operation; all that would occur then would be that the battery would not be charged.

FIGS. 5 and 6 show a shaving apparatus similar to that described above, except that the power unit P' is adapted to be plugged into a conventional automobile cigar lighter socket (not shown). Thus, the male plugs 6 are replaced by a single two-pole male socket 16 adapted to be received in a cigar lighter socket, and in lieu of the transformer and rectifier, the adapter means comprise resistors 17 and 18, the latter being in parallel with a switch 19. The resistor 17 serves to reduce the voltage of the automobile battery to that suitable for running the motor 2, and the resistor 18 is a current-limiting resistor corresponding to the resistor 10 of the above-described embodiment.

The shaving apparatus S, C and P' may be used in the same manner as described above, in that when the shorter connector plug 13 is connected to the power unit P', the switch 19 will remain closed at which time the other plug, i.e., the longer plug 14, can be connected to the shaving unit S only if the battery B has been removed, as shown in FIG. 5. Conversely, when the shorter plug 13 is connected to the shaver units, the only remaining plug, i.e., the longer plug 14, will cause the switch 19 to open so that the current-limiting resistor 18 is effective to limit the charging current to a safe value.

If desired, other power units may be provided for use in conjunction with the shaving unit S and the connecting means C. For example, one may use a power unit of the type shown in FIGS. 1 and 2 but incorporating means for deactivating the rectifying means, so that the power unit may be connected either to an alternating current source or to a direct current source.

FIGS. 7 and 8 are schematic representations of an arrangement whereby any polarity error in placing the battery into the shaving unit S is prevented. In FIG. 7 the battery is connected to a rectifier network 23 which connected to the secondary winding of a transformer 22, the input terminals 20 of the primary winding of this transformer being connectible to a source of alternating current. A switch 21 is provided for turning the charging circuit on and off. In FIG. 8, the battery is shown as being connected to the motor 2 by way of the switch 3.

The battery B has two opposite end faces one of which carries a centrally-positioned disk-shaped positive contact 25 and the other of which end faces carries an annular negative contact 26. The first-mentioned end face also carries an insulating ring 27 which encompasses the contact 25 and the other end face carries a centrally positioned insulating disk 28. The diameter of the insulating disk 28 is greater than the inside diameter of the insulating ring 27 and smaller than the outside diameter thereof so that projections of the insulating layers onto a plane parallel to the end faces of the battery overlap each other.

The shaving unit carries instead of the single pair of contacts 4 shown above for the sake of simplicity, a pair of electrically connected positive contacts 29, 31 and a pair of electrically connected negative contacts 30, 32. The battery B can be inserted into the shaving unit either in the position shown in FIG. 7 or in the position shown in FIG. 8, but irrespective of which of these positions the battery occupies, the battery will be connected with the same polarity. Thus, when the battery is in the position shown in FIG. 7, the positive contact 25 of the battery will be in electrical engagement with the positive contact 29 of the shaving unit and the negative contact 26 of the battery will be in electrical engagement with the negative contact 32 of the shaving unit. When the battery occupies the position shown in FIG. 8, the positive contact 25 of the battery will be in electrical engagement with the positive contact 31 of the shaving unit, and the negative contact 26 of the battery will be in electrical engagement with the negative contact 30 of the shaving unit. It will be seen, therefore, that the polarity of the battery-shaving unit connection is the same, regardless of which of the two positions the battery occupies.

It will be understood that the present invention is susceptible to modifications in order to adapt it to different usages and conditions, and, accordingly, it is desired to comprehend such modifications within this invention as may fall within the scope of the appended claims.

What is claimed is:

1. In a shaving apparatus, the combination of a shaving unit having a shaving head, a motor connected to said shaving head for driving the same, means defining space in said unit for receiving a removable rechargeable battery, connector means in said unit electrically connecting said motor for making contact with a battery when inserted; a power source unit separate from said shaving unit and connectable to an external source of electric energy, said power source unit having means therein to adapt the electrical energy from said source for selectively energizing said shaving unit motor and recharging said battery, selector switch means in said power unit governing said energy adaption means; and electrical connection means for interconnecting said shaving unit at said connector means and said power source unit in two modes and including means preventing the battery from being connected to said motor in one mode of connection only while actuating said switch means in the other mode of connection only.

2. A shaving apparatus comprising: a first unit with shaving head, a motor in said first unit for driving said head, externally accessible connector means at said unit, electrically connected to said motor, contact means in said head connected to said motor, said unit defining space for receiving a rechargable battery connectable to said contact means; a second unit including plug means for connection to an external source of electrical energy, electric voltage and current conversion means connected to said plug means and defining two selective voltage levels for respectively energizing said motor and recharging said battery, externally accessible connector means in said second unit connected to the output of said conversion means, and switching means in said second unit having two operating positions and governing said conversion means as to the voltage level permitted at said connector means of said second unit; and a connector element having first and second terminal plugs, each being capable of electric connection with any of said externally accessible connector means, said plugs having differently shaped actuating elements so that upon insertion of said first plug in said second unit, said switching means is maintained positively in one of its operating positions, while upon insertion of said second plug in said second unit, said switching means is maintained positively in the other operating position.

3. In a shaving apparatus as claimed in claim 1 and further comprising means on said power source unit for adapting said power source unit to connection to sources of electrical energy maintained at different voltages, and means in said power source unit for reduction of the voltage of the source electrical energy to a voltage suitable for operating said shaving apparatus.

4. In a shaving apparatus, as claimed in claim 1, wherein said rechargeable battery comprises a pair of contact surfaces which are insulated from each other, and shaving unit comprising pairs of resilient contact arms for engagement with said battery contact surfaces, said spring arms being so arranged with respect to said battery contact surfaces that one arm of each pair contacts one of said contact surfaces with the contact arms in engagement with the contact surfaces being of the same polarity as the contact surfaces.

5. In a shaving apparatus as claimed in claim 4 and further comprising insulating surfaces adjacent said battery contact surfaces with said insulating surfaces being engaged by the other of the contact arms of each pair of contact arms.

6. In a shaving apparatus as claimed in claim 5 wherein one of said contact surfaces comprises a circular disc and the other of the contact surfaces comprises an annular member, there being an insulating surface in the form of an annular member surrounding said disc contact surface and a circular disc insulating surface positioned within the central portion of the annular contact surface, the diameter of the circular insulating disc being larger than the inner diameter of the annular insulating surface but smaller than the outer diameter of said annular insulating surface.

7. In a shaving apparatus as claimed in claim 1 wherein said power source unit comprises means for connection to a source of alternating current, and said power unit further comprises rectifier means for rectifying alternating current.

8. A shaving apparatus as claimed in claim 1 and further comprising means on said power source unit for adapting said unit to be connected to a conventional cigar lighter socket of an automobile.

9. A shaving apparatus comprising, in combination: a first unit having a shaving head and including a motor for driving said shaving head, two connector elements connected to said motor and defining two main terminals, a removable and chargeable battery electrically connectable to said motor; a second unit having connection means connectable to an external source of electric energy and including a voltage and current changing network, connected to said connector means, and having two output terminals, a series resistor connected with one end to one of said terminals, the other end of said resistor and the other output terminal defining two main terminals, a switch capable of overbridging said resistor; an electrical connector having two plugs, each plug capable of making connection with two of said four main terminals, and a protrusion at one of said plugs, which, when said plug makes connection with said two main terminals of said first unit, prevents the battery from being inserted, while, when making connection with said two terminals of said second unit, opens said switch so as to place said series resistor in circuit between said battery and said network.

10. A shaving apparatus comprising, in combination: a first unit including a shaving head, a motor for driving said shaving head, terminal means connected to said motor, a removable and rechargeable battery electrically connected with said terminal means; a second unit including electrical connector means connectable to an external source of electric energy, a circuit network connected to said connector means and capable of converting voltage and current as derived from said source to two levels for respectively operating said motor and recharging said battery, a switch connected to said network and determining the operating level of said network, terminal means connected to said network via said switch; an electrical connector terminating in two plugs for interconnecting said two units by their associated terminal means, one of said plugs having a protrusion which, when inserted in said first housing, prevents insertion of said battery while, when inserted in said second housing, operates said switch so as to place said network in condition for recharging said battery.

11. A shaving apparatus as set forth in claim 10 the other one of said plugs being also provided with a protrusion, having a length different from the length of said first mentioned protrusion and incapable of preventing insertion of battery and operating said switch; openings in said units for receiving said protrusions when plugs are connected to said units, said protrusions being insertable into said openings so as define only one mode of connection between the terminals of the first unit and the terminals of the second unit, whereby correct polarity between said network and said battery and motor is assured.

12. A shaving apparatus comprising, in combination: a first unit including a shaving head, a motor for driving said shaving head, terminal means connected to said motor, a removable and rechargeable battery, electrically connected with said terminal means; a second unit including electrical connector means connectable to an external source of electric energy, resistance means connected in series to said connector means, a switch connected across as least a portion of said resistance means for bridging the same when closed, terminal means connected to said connector means and said resistance means; an electrical connector terminating in two plugs for interconnecting said two units by their associated terminal means, one of said plugs having a protrusion which, when inserted in said first unit, prevents insertion of said battery while, when inserted in said second unit, operates said switch.

References Cited in the file of this patent

UNITED STATES PATENTS

| | | |
|---|---|---|
| 2,197,910 | Ament | Apr. 23, 1940 |
| 2,293,354 | Munchow | Aug. 18, 1942 |
| 2,478,887 | Nelson | Aug. 9, 1949 |
| 2,857,570 | Simpson | Oct. 21, 1958 |
| 2,867,039 | Zach | Jan. 6, 1959 |